(12) United States Patent
Guo et al.

(10) Patent No.: US 7,444,741 B2
(45) Date of Patent: Nov. 4, 2008

(54) PROCESS TO MANUFACTURE A CPP GMR READ HEAD

(75) Inventors: Yimin Guo, San Jose, CA (US); Li-Yan Zhu, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 11/880,585

(22) Filed: Jul. 23, 2007

(65) Prior Publication Data

US 2008/0062585 A1 Mar. 13, 2008

Related U.S. Application Data

(62) Division of application No. 10/771,481, filed on Feb. 3, 2004, now Pat. No. 7,246,427.

(51) Int. Cl.
*G11B 5/127* (2006.01)
*H04R 31/00* (2006.01)

(52) U.S. Cl. .............. 29/603.16; 29/603.13; 29/603.15; 29/603.18; 216/65; 360/122; 360/317; 451/5; 451/41

(58) Field of Classification Search . 29/603.13–603.16, 29/603.18; 216/65; 360/121, 122, 317, 324–327; 451/5, 41
See application file for complete search history.

(56) References Cited

U.S. PATENT DOCUMENTS

| | | | |
|---|---|---|---|
| 5,739,987 A | 4/1998 | Yuan et al. | |
| 6,353,318 B1 * | 3/2002 | Sin et al. | 324/252 |
| 6,496,334 B1 | 12/2002 | Pang et al. | |
| 6,560,077 B2 | 5/2003 | Fujiwara et al. | |
| 7,094,130 B2 * | 8/2006 | Cyrille et al. | 451/29 |
| 2002/0131215 A1 | 9/2002 | Beach | |

* cited by examiner

*Primary Examiner*—Paul D Kim
(74) *Attorney, Agent, or Firm*—Saile Ackerman LLC; Stephen B. Ackerman

(57) ABSTRACT

Biasing schemes used for CIP GMR devices were previously thought to be impractical for CPP devices due to current shunting by the abutted hard magnets. In the present invention the CPP stripe is a narrow conductor directly above the free layer. The resistivity of the latter is made to be relatively high so the sensing current diverges very little as it passes through it. This makes it possible to use abutted hard magnets for longitudinal bias with virtually no loss of sensing current due to shunting by the magnets.

12 Claims, 3 Drawing Sheets

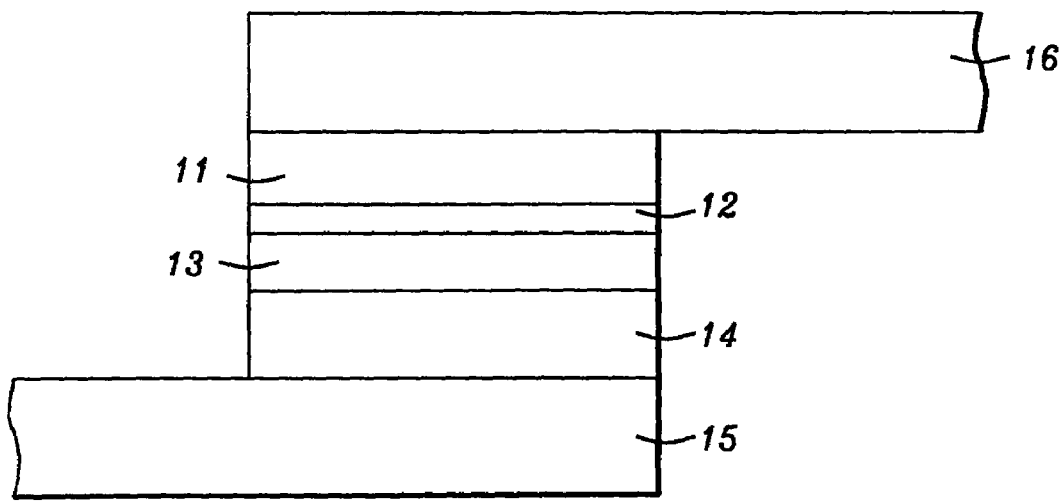
*FIG. 1 – Prior Art*
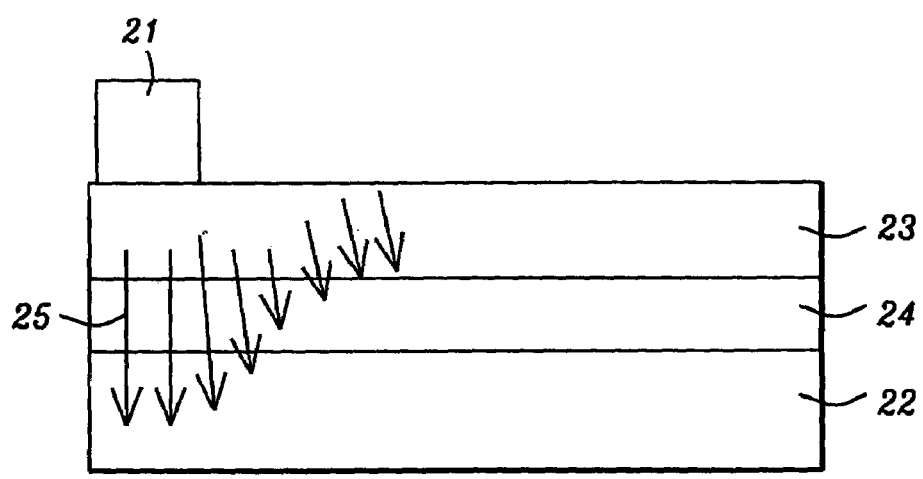
*FIG. 2*

PROCESS TO MANUFACTURE A CPP GMR READ HEAD

This is a divisional application of U.S. patent application Ser. No. 10/771,481, filed on Feb. 3, 2004, now U.S. Pat. No. 7,246,427 which is herein incorporated by reference in its entirety, and assigned to a common assignee.

FIELD OF THE INVENTION

The invention relates to the general field of magnetic read heads with particular reference to providing longitudinal stabilization for CPP devices.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve or SV. The resulting increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The key elements of a spin valve can be seen in FIG. 1. They are low coercivity (free) ferromagnetic layer 11, non-magnetic spacer layer 12, magnetically pinned layer 13 and magnetic pinning layer 14 (generally an antiferromagnetic material). Also seen in the figure are lower and upper conductive leads 15 and 16 respectively. In practice there would also be a capping layer (not shown) directly above the free layer and upper and lower magnetic shields (shown as 61 and 62 respectively in FIG. 6).

When the free layer is exposed to an external magnetic field, the direction of its magnetization is free to rotate according to the direction of the external field. After the external field is removed, the magnetization of the free layer will stay at a direction, dictated by the minimum energy state, which is determined by the crystalline and shape anisotropy, current field, coupling field, and demagnetization field. If the direction of the pinned field is parallel to the free layer, electrons passing between the free and pinned layers, suffer less scattering. Thus, the resistance in this state is lower. If, however, the magnetization of the pinned layer is anti-parallel to that of the free layer, electrons moving from one layer into the other will suffer more scattering so the resistance of the structure will increase.

First generation GMR devices were designed so as to measure the resistance of the free layer for current flowing in the plane (CIP) of the film. However, as the quest for ever greater densities continues, devices that measure current flowing perpendicular to the plane (CPP) are also being developed. For devices depending on in-plane current, the signal strength is diluted by parallel currents flowing through the other layers of the GMR stack.

Although the layers enumerated above are all that is needed to produce the GMR effect, additional problems remain. In particular, there are certain noise effects associated with these structures. Magnetization in a layer can be irregular because of reversible breaking of magnetic domain walls, leading to the phenomenon of Barkhausen noise. The solution to this problem has been to provide a device structure conducive to ensuring that the free layer is a single domain so that the domain configuration remains unperturbed after fabrication and under normal operation.

This is readily accomplished in a CIP device by placing permanent magnets on either side of the GMR stack. These abut the free layer and ensure that it remains a single domain at all times. Since, in the CIP design, sensing current flows along the line connecting the bias magnets, any sensing current that gets shunted into them can still be directed into the leads and thus be detected, so the bias magnets can be placed close together without affecting the read width of the device.

In the case of a CPP device it is much more difficult to establish longitudinal magnetic bias. Bias by in-stack magnets is constrained by the stack thickness and suffers from conflicts between the longitudinal and the transverse biases. Biasing schemes used for CIP GMR devices were previously thought to be impractical for CPP devices due to current shunting by the abutted hard magnets.

The present invention provides a solution to this problem.

A routine search of the prior art was performed with the following references of interest being found:

In U.S. Pat. No. 6,560,077, Fujiwara et al. disclose a conducting part having an area smaller than an area of the free layer while Pang et al. show lead structures abutting a sensor layer in U.S. Pat. No. 6,496,334. Yuan et al. (U.S. Pat. No. 5,739,987) describe a lead that defines an active read track width while Beach teaches two hard magnets, one on either side of a free layer and a lead on an AFM layer, in US 2002/0131215.

SUMMARY OF THE INVENTION

It has been an object of at least one embodiment of the present invention to provide a CPP GMR magnetic read head.

Another object of at least one embodiment of the present invention has been that said read head have both longitudinal bias stability as well as minimal side writing.

Still another object of at least one embodiment of the present invention has been to provide a process for manufacturing said read head.

These objects have been achieved by defining a read width whose value is very close to that of a narrow conductor directly above the free layer. The resistivity of the latter is made to be relatively high so the sensing current diverges very little as it passes through it. This makes it possible to use abutted hard magnets for longitudinal bias in a similar manner to that of CIP devices but with virtually no loss of sensing current due to shunting by the magnets.

A process for manufacturing the device is described. Said process requires very little modification of processes currently in use for the manufacture of CPP devices.

BRIEF DESCRIPTION OF THE DRAWINGS

FIG. 1 shows a CPP GMR read head of the prior art.

FIG. 2 shows how spreading resistance from the CPP stripe into the free layer may be computed by analogy with a heat flow process.

DESCRIPTION OF THE PREFERRED EMBODIMENTS

We now disclose a novel structure, in which a pair of hard magnets is abutted to a CPP sensing film. A key feature of the structure is that the distance between the magnets is significantly greater than the intended magnetic read-width. This allows the longitudinal magnetic bias to be readily established while continuing to use processes well-established for CIP GMR devices.

The actual read-width is defined by the CPP stripe which is an electrical lead made of a good electrical conductor such as copper. The width of this lead is in turn defined by a via in a thin dielectric capping layer, above the free-layer. The free-layer is typically approximately 20 Angstroms thick and comprises any of the following compositions—CoFe/NiFe, NiFe, CoFe, CoFeB, CoFeB/NiFe, $CoFePt_{x<0.1}$, $CoFePd_{x<0.1}$, $CoFePt_{x<0.1}$/NiFe, and $CoFePd_{x<0.1}$/NiFe. A thin capping layer, typically a few Angstroms of Ta, may optionally be applied immediately above the free-layer.

Figure 6:
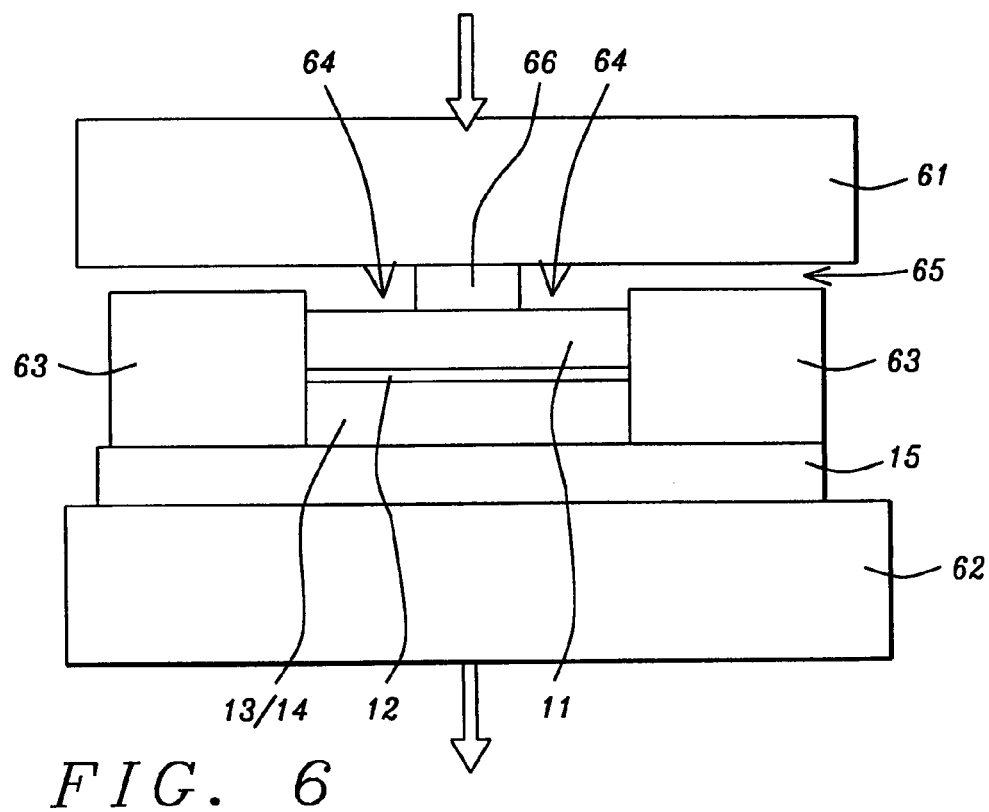
FIG. 6 is a cross-sectional view of the completed structure.

This CPP stripe is connected to the upper shield (61 in FIG. 6). The CPP device also includes a second lead which is substantially wider and thicker than the CPP stripe described above. It is connected to lower shield 62 through a conductive but non-magnetic gap. Electrical contact between the lower-shield and the pinning layer is along the entire CPP stack width so as to reduce the contact resistance.

At first sight, such a structure would not be expected to work as the electrical sensing current would leak through the edges of the CPP stack into the hard magnets. Furthermore, such leakage would cause "side-reading", a serious defect for any magnetic recording device.

Consider, however, the effect of using a very thin free layer together with a relatively small junction area-resistance product (RA). It can be shown that the resulting leakage will be quite small. We illustrate this in FIG. 2 which is a heat transfer analog of the electrical structure just described:

Heat is to be transferred from small area heat source 21 to large area heat sink 22 through layers 23 and 24. It can be shown, using standard heat transfer equations, that, provided layer 23 has relatively poor thermal conductance, the heat flow will be as depicted by vectors 25. i.e. most of the heat flow will be directed normal to 21 with very little heat being lost laterally because of flow along layer 23. Substitution of current flow for heat flow and electrical conductivity for thermal conductivity can be made without changing the basic format of this result.

As a concrete example, if the thickness of the free layer is 20 Angstroms, its resistivity is 59 microhm cm, $RA=1\times10^{-13}$ 3 $m^2$, then it can be computed that the characteristic leakage length (i.e. side-reading) will be $1.9\times10^{-18}$ m ($=19$ nm). This amount of side reading is comparable to what is obtained in current GMR devices, both for CIP and CPP.

It is also important to note that additional reductions in electrical side-reading for the device of the present invention can be obtained by doping the free-layer to increase its resistivity. Thus this technology is extendable for narrower read widths in the future. At present, a typical resistivity for the free layer is between about 50 and 80 microhm-cm. This is achieved by using a free layer of CoFe/NiFe and doping it with up to 10 atomic percent of Pt or Pd. The resulting film has significantly higher resistivity without any sacrifice of its magnetic properties, particularly the magneto-resistive ratio.

We now disclose a process for the manufacture of the present invention. Referring to FIG. 6, the process begins with lower magnetic shield 62 onto which is deposited bottom conductive lead layer 15. Then depositing, in succession (as in FIG. 1), pinning layer 14, pinned layer 13, non-magnetic spacer layer 12, and free layer 11 (having a resistivity of at least 30 microhm cm, up to as high as 300 microhm cm, and a thickness between about 10 and 40 Angstroms), thereby forming the GMR stack.

Figure 3:
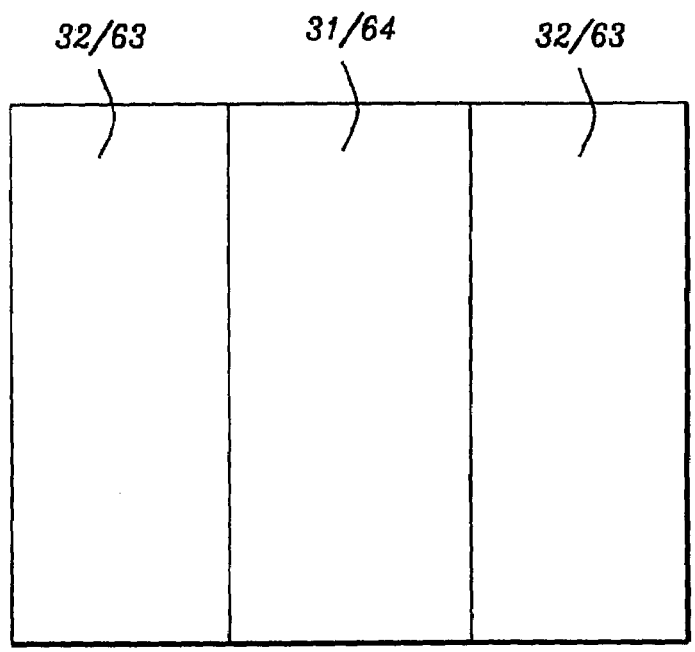
FIG. 3 shows the early stages of the manufacturing process where permanent magnets are formed to flank part of the GMR stack.

Referring now to FIG. 3, this GMR stack is now patterned into a central stripe 31 (between about 0.05 and 0.2 microns wide, with between about 0.05 and 0.03 microns being preferred) which is flanked by opposing trenches 32 that extend down as far as bottom conductive lead layer 15 (resulting in a typical depth of between about 0.01 and 0.05 microns). Trenches 32 are then selectively over-filled with magnetically hard material (such as CoCrTa, CoPtTa, CoPt, CoCrPt or other Co alloys) whose top surface extends above the free layer, thereby forming a pair of bias magnets 63 (also seen in FIG. 6) that abut free layer 11. At the same time, cavity 64 gets formed between the bias magnets.

Figure 4:
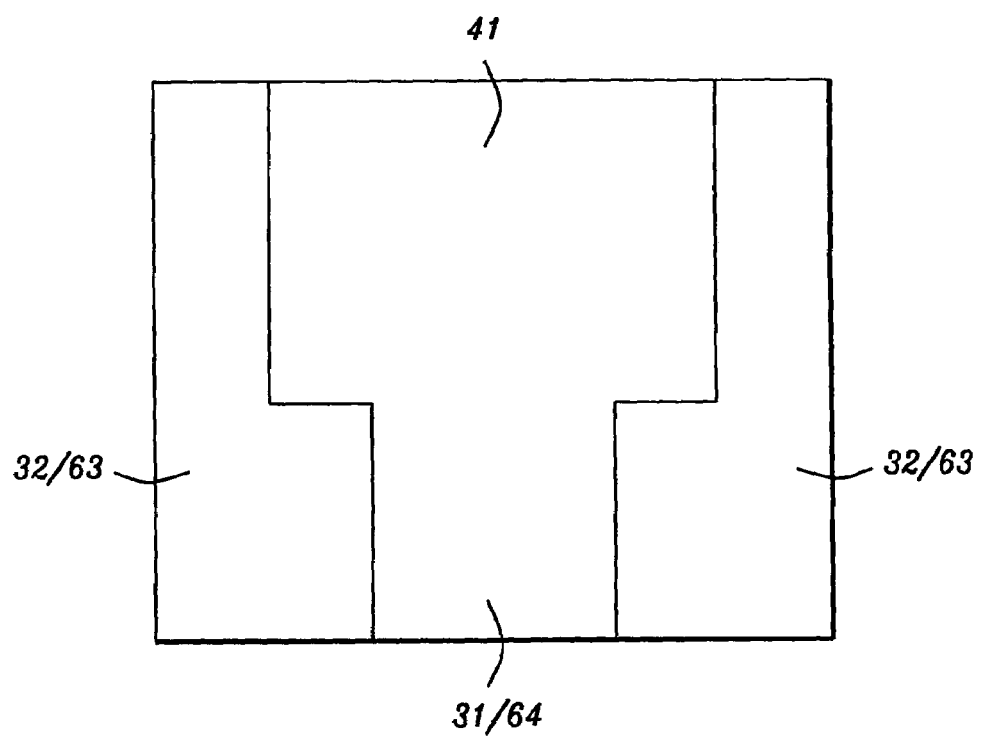
FIG. 4 shows widening of the main cavity.
Figure 5:
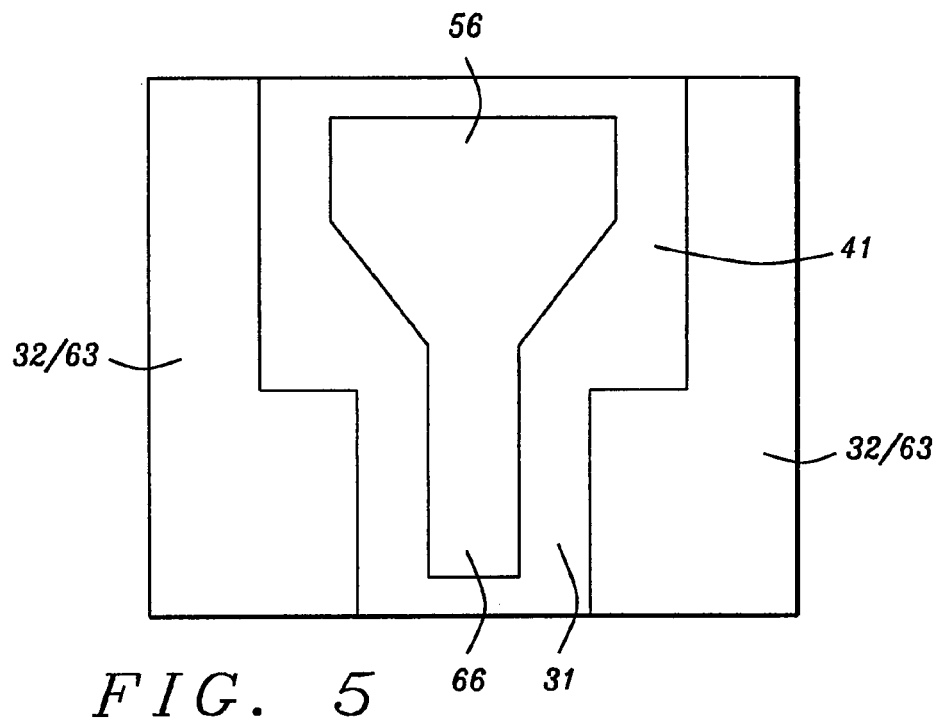
FIG. 5 is a plan view of the completed structure.

Referring next to FIG. 4, a portion of cavity 64 is widened (through removal of hard magnetic material down as far down as free layer 11 and patterning to define the back side of the CPP stripe height), to a width of between about 0.1 and 0.5 microns, thereby forming cavity 41. The latter is refilled with a dielectric material such as alumina. This is followed by the deposition of a fully covering layer of a good conductor (such as copper) which is in electrical contact with the CPP stripe. This conductor is then patterned to define a narrow read width. Patterned conductor 66 is symmetrically positioned+ within cavity 64, extending and expanding beyond the back side of the CPP stripe. Conductor 66 is typically between about 50 and 300 Angstroms thick.

A key feature of the invention is that CPP stripe 66 has a width between about 0.02 and 0.2 microns (with between about 0.02 and 0.15 microns being preferred) and at least 0.02 microns less than the width of cavity 31 (i.e. the distance between bias stabilizing magnets 63).

Next, cavities 41 and 64 and bias magnets 63 are over-filled with insulation 65 to a thickness that exceeds that of the CPP stripe and then planarized until CPP top conductor 66 is just exposed; as shown in FIG. 6.

The process concludes with the deposition and patterning of magnetically soft upper shield 61 that contacts and conforms to CPP top conductor 66 as well as cavities 31 and 41. Suitable materials for the top conductor layer include, but are not limited to, Cu, Au, Au/Ta, and Cu/Ta.

In summary, the advantages of the present invention include:

1. Very narrow read-width can be achieved with changes to only one critical layer (the top lead width).

2. Read-back signal quality is improved.

3. A stable and precise magnetic longitudinal bias is established.

4. A low lead-resistance is achieved.

5. The device can be produced with conventional equipments and processes.

What is claimed is:

1. A process to manufacture a CPP GMR read head having both narrow track width and effective longitudinal stabilization, comprising:

providing a substrate and depositing thereon, in succession, a lower magnetic shield, a bottom conductive lead layer, a pinning layer, a pinned layer, a non-magnetic spacer layer, and a free layer, thereby forming a GMR stack;

patterning said GMR stack into a central stripe, having a first width, flanked by opposing trenches that extend down as far as said bottom conductive lead layer;

selectively over-filling said trenches with magnetically hard material whose top surface extends above said free layer, thereby forming a pair of bias magnets that abut said free layer and, between said bias magnets, a first cavity, having a depth;

widening a portion of said first cavity, through removal of hard magnetic material down as far as said free layer, thereby forming a second cavity;

forming, on said free layer within the first cavity, a CPP top conductor, having a thickness greater than the depth of the first cavity, that is symmetrically disposed within said first cavity and that has a second width that is at least 0.02 microns less than said first width;

over-filling said first and second cavities with a layer of insulation to a thickness that exceeds that of the CPP top conductor and then planarizing until said CPP top conductor is exposed; and depositing and patterning an upper shield layer that contacts and conforms to said CPP top conductor in the first cavity and widens to a third width in the second cavity.

2. The process recited in claim 1 further comprising deposition of a capping layer directly onto said free layer.

3. The process recited in claim 1 wherein said first width is between about 0.05 and 0.2 microns.

4. The process recited in claim 1 wherein said CPP top conductor has a thickness between about 50 and 300 Angstroms.

5. The process recited in claim 1 wherein said CPP top conductor is selected from the group consisting of Cu, Au, Cu/Ta, and Au/Ta.

6. The process recited in claim 1 wherein said opposing trenches have a depth of between about 0.01 and 0.05 microns.

7. The process recited in claim 1 wherein said magnetically hard material is selected from the group consisting of CoPt, CoCrPt, and CoCrTa.

8. The process recited in claim 1 wherein said second width is between about 0.02 and 0.15 microns.

9. The process recited in claim 1 wherein the depth of the first cavity is between about 0.01 and 0.03 microns.

10. The process recited in claim 1 wherein said free layer has a resistivity between about 30 and 300 microhm cm.

11. The process recited in claim 10 wherein the step of depositing said free layer further comprises depositing an alloy selected from the group consisting of CoFe/NiFe, NiFe, CoFe, CoFeB, CoFeB/NiFe, $CoFePt_{x<0.1}$, $CoFePd_{x<0.1}$, $CoFePt_{x<0.1}$/NiFe, and $CoFePd_{x<0.1}$/NiFe.

12. The process recited in claim 1 wherein said upper shield layer is a soft magnetic material.

\* \* \* \* \*